Sept. 22, 1970 R. F. BROWN, JR 3,530,257
MODULATION OF AN OSCILLATORY CIRCUIT FOR DRIVING
A MAGNETIC RECORDING HEAD
Filed July 22, 1968
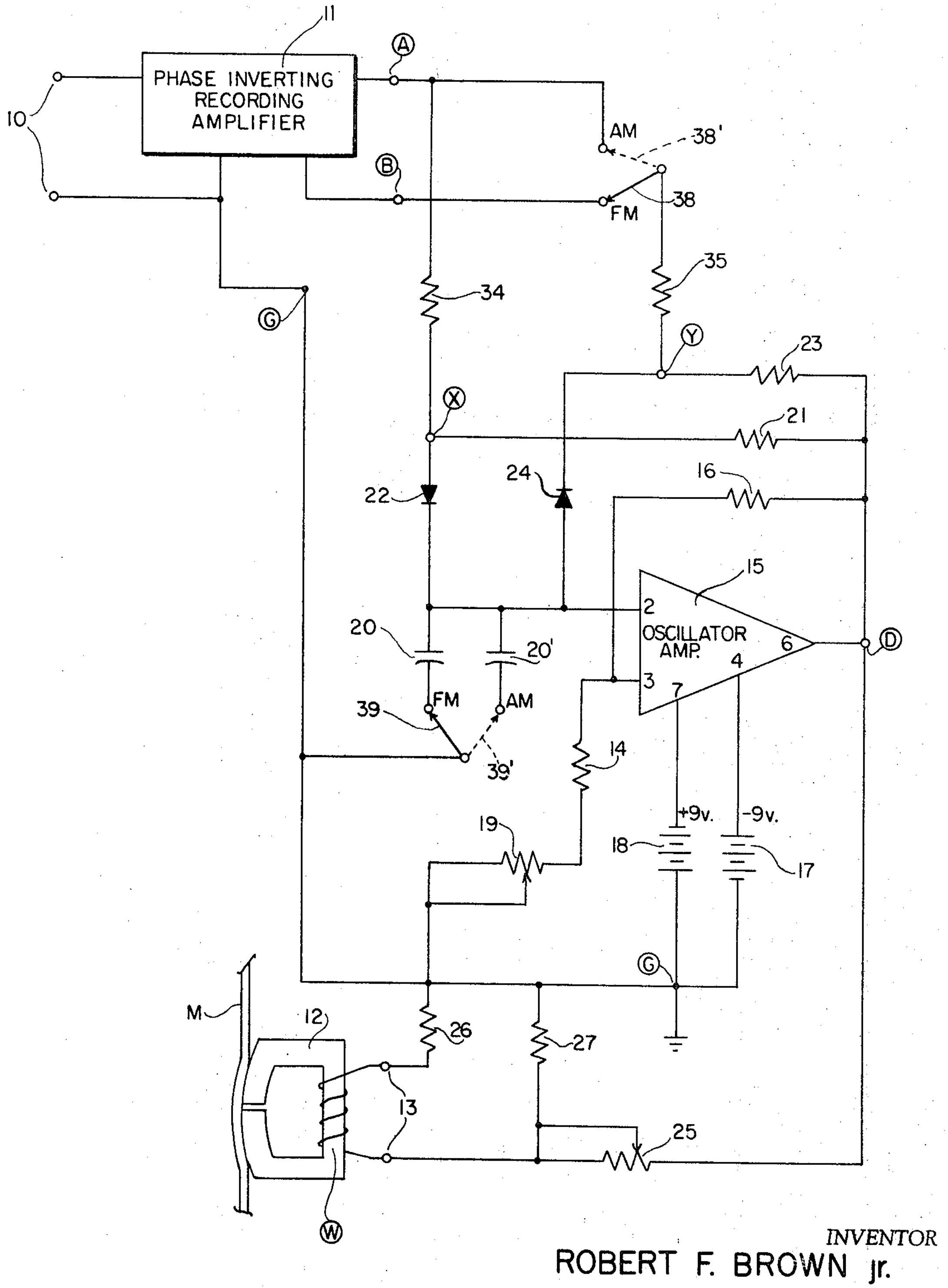
INVENTOR
ROBERT F. BROWN jr.
BY Alexander & Dowell
ATTORNEYS United States Patent Office 3,530,257
Patented Sept. 22, 1970

3,530,257

MODULATION OF AN OSCILLATORY CIRCUIT FOR DRIVING A MAGNETIC RECORDING HEAD

Robert F. Brown, Jr., Dallas, Tex., assignor to Teledyne Industries—Geotech Division, a corporation of Texas Filed July 22, 1968, Ser. No. 746,546
Int. Cl. G11b 5/04, 5/06; H03b 5/20
U.S. Cl. 179—100.2 9 Claims

ABSTRACT OF THE DISCLOSURE

An oscillatory circuit for driving a magnetic recording head to record analog intelligence signals in either one of two selectible modes, i.e., frequency modulation of a carrier supplied by the oscillator, or amplitude modulation resembling signals recorded by ordinary AC-biased techniques, the latter also being claimed as a method. The system employs the same oscillatory circuit in both cases, this circuit operating in one mode as a voltage-controlled oscillator wherein both half cycles of the oscillations are either lengthened or shortened depending upon the polarity of said analog input signal, and operating in the other mode in such a way that the analog input, depending upon its polarity, either shortens or lengthens one half cycle of oscillation with respect to the other, whereby the zero axis of the oscillations is shifted up or down with changes in amplitude and polarity of the analog input signal to produce in the magnetic recording head a single oscillation signal resembling the composite of an analog signal plus AC-bias which is normally introduced into a recording head by prior art recording techniques. The mode of recording is conveniently determined by simple switch means.

This invention relates to recording head driver circuitry comprising an oscillatory circuit which can be employed to record on a magnetic recording medium either in a frequency-modulated mode or in an amplitude-modulated mode, the circuitry of the oscillator and modulating means and method being themselves novel.

It is a principal object of this invention to provide an improved recording head driver circuit especially compatible for use with modern integrated circuit amplifiers, the circuit being relatively insensitive to production tolerance differences between individual integrated circuits, which in the present oscillator operate at saturation except during brief instants when the oscillator is flipping over from one condition of saturation to the other.

Another major object of the invention is to provide a magnetic head driver circuit capable of accomplishing more linear modulation of the recorded medium than is obtained by many prior art techniques. For instance, linearities of the order of a tenth of one percent are common with this circuit, as compared with linearities of about one percent using common unijunction driver devices.

Another important object of this invention is to provide a magnetic head driver circuit which is substantially unaffected by temperature variations since it operates at saturated levels, and therefore requires no compensation when used in ordinary ambient environments.

Another object of the invention is to provide a novel oscillatory driver circuit employing a differential amplifier having an output and having two inputs, one of which inverts with respect to the output polarity and the other of which is non-inverting. Positive feedback to the non-inverting input causes saturation in one direction, but negative feedback through integrating means to the inverting terminal eventually flops the circuit to the other condition of saturation, thereby causing oscillation. This oscillation can then be selectively modulated in one of several modes by modifying the rate of charging of said integrating means during successive half cycles in response to changes in input signal amplitude and polarity.

Other objects and advantages of the invention will become apparent during the following discussion of the drawing, which shows one practical embodiment of the oscillator driver circuit according to the present invention.

Referring now to the drawing, the circuit receives an analog intelligence-signal input from terminals 10 which may be connected to any suitable transducer providing an analog signal to be recorded in one of the two modes mentioned above. A suitable input can be taken from the amplifier system set forth in my copending application Ser. No. 726,715, filed May 6, 1968, and entitled "Amplifier for Enhancing Differential Input Signals."

In any event, the input signal is applied to terminal 10 of a suitable recording amplifier 11 having push-pull balanced output terminals A and B.

The output of the driver system according to the present invention is delivered to a magnetic recording head 12 having a winding W connected to the output terminals 13 of the present circuit, and the variations in the head flux are then recorded upon a magnetic tape or other recording medium M which is transported past the recording head by means which are not shown in the present drawing.

The present circuit comprises an integrated-circuit operational amplifier 15 which is connected to oscillate, and the output of the resulting oscillator circuit is delivered by a suitable matching network to the recording head 12 to be recorded upon the magnetic medium M in the manner to be hereinafter explained.

The amplifier 15 has two input terminals respectively labeled 2 and 3, the amplifier having a high gain and being provided with feedback through the resistor 16 extending from the output terminal 6 of the integrated circuit 15 to the input terminal 3. The resistor 16 provides a first path of positive feedback to the non-inverting input terminal 3, thereby causing the amplifier to lock at either positive or negative saturation. Power is supplied to the integrated circuit 15 at terminals 4 and 7 from a source with respect to a common ground terminal G, the source being represented by batteries 17 and 18. The remaining terminals of the amplifier circuit 15 are not used because there is no need to stabilize the amplifier chip since its operation is essentially either at plus or minus saturation and involves no class A operation.

The integrated circuit 15 is a differential operational amplifier chip having a commercial type designation as shown in the table appearing at the end of this specification. The output terminal 6 does not invert with respect to the input terminal 3, but does invert with respect to the input terminal 2. As indicated above, the feedback impedance 16 will cause the amplifier 15 to saturate either in the positive or negative direction, and in the absence of input at the inverting terminal 2, this saturation condition would become steady-state.

The oscillation of the amplifier 15 can be explained as follows. Assume that when power is applied to the circuit 15, the input terminal 3 is somewhat positive with respect to the terminal 2, and that because of the high gain of the circuit 15, the output terminal rises rapidly to positive saturation, thereby applying a strong positive feedback through impedance 16 to the input terminal 3 to lock up the amplifier 15 at positive saturation. The resistors 14 and 19 provide a return to ground from the non-inverting terminal 3, and by adjustment of the resistance of the potentiometer 19 the DC level of feedback to terminal 3 through the impedance 16 can be adjusted to be a suitable operating value which is always less than the output level at terminal 6.

As long as the inverting terminal 2 is less positive than the terminal 3, the amplifier chip 15 will remain locked up at positive saturation. However, the terminal 2 is being slowly charged to and beyond the positive level of the terminal 3 by voltages which charge the capacitor 20 or 20′, depending upon the position of switch 39, in the positive direction. Capacitors 20 and 20′ are shown as two separate units, one used for FM mode operation, and the other used for AM mode operation, because it is generally desirable for the two carrier frequencies to be substantially different when operating in these two different modes, and this is a convenient way to produce the frequency difference. The following section assumes switch 39 is in the FM position, and capacitor 20 is actively in the circuit. Recalling that the terminal 6 is at positive saturation, its output voltage is being fed back through a second feedback path including the resistor 21 and the diode 22 to charge the capacitor 20 in the positive direction. No feedback is applied through the other part of the second feedback path via the resistor 23 to the capacitor 20 because the diode 24 is reverse-biased through the resistor 23. The length of time required to charge the top of capacitor 20 to and beyond the positive level of terminal 3 depends upon the time constant of the resistor 21 and the capacitor 20. Now, if nothing occurred to change the voltage at the output terminal 6, eventually the capacitor 20 could be charged to this full level, and when so charged would be at a much more positive level than the terminal 3 because the resistances 14 and 19 form a voltage divider with the feedback resistor 16 so that the terminal 3 can never be as positive as the terminal 6. Thus, the voltage level of the terminal 2 will eventually surpass the voltage level at the terminal 3 in the positive direction.

When this occurs the amplifier chip 15 flops over in the opposite direction and the terminal 6 heads rapidly toward negative saturation, thereby feeding back negative voltage through the resistor 16 to the non-inverting terminal 3 which then locks up the output at terminal 6 of the amplifier 15 at negative saturation. Since the output terminal 6 is now negative, the diode 22 becomes blocked and the diode 24 becomes conductive, and the negative level at terminal 6 begins charging the capacitor 20 in the negative direction through the resistor 23 and the diode 24 until the amplifier again flops over to positive saturation.

The oscillatory process thus continues, and if the resistors 21 and 23 are of magnitudes in the same ratio as the output levels of saturation, the output at terminal 6 of the oscillator amplifier 15 will be essentially a square wave whose period is determined by the time constant of the integrating means which comprises the capacitor 20 taken with whichever of the impedances 21 or 23 is conducting at any particular moment of time. The oscillator's output at terminal 6 is coupled to the head winding W by a network including the resistors 25, 26 and 27. The resistor 26 is used as a current-monitor device, the adjustable potentiometer 25 serves to determine the peak current which can be drawn by the winding of the head 12, and the resistor 27 serves as an impedance matching expedient to provide the desired drive circuit time constant.

As indicated in the objects as set forth in this invention, the output of the oscillator amplifier 15 can be used to record upon the medium M in either one of two selectible modes and these modes will now be separately described as follows.

FREQUENCY MODULATION RECORDING MODE

In the frequency modulation mode of recording, only the frequency of oscillation should be modulated, and this modulation is accomplished by effectively varying the charging rate of the capacitor 20 by increasing or decreasing the level of the potential applied to it respectively in the positive and negative directions in order to vary the elapsed time before the amplifier 15 will flip over to the opposite mode of saturation. The description of the general manner of oscillation set forth in the preceding paragraphs describes free running oscillations without any effort to modulate their rate. Assuming now that the oscillations are to be frequency modulated, this is accomplished by input at the terminals 10 arriving through the recording amplifier 11 to provide selectible mutually-inverted analog signals at points A and B.

At any particular instant, the momentary value of the analog input signal will comprise certain opposed voltage levels, either positive or negative at terminals A and B, and these levels will be coupled to the terminals X and Y respectively through the coupling resistors 34 and 35 to affect the charge rates of the capacitor 20, and thereby change its effective time constant which in turn changes the oscillating frequency of the oscillator amplifier 15, thereby frequency modulating it. Moreover, it is desirable during this mode of operation to have the positive and negative half cycles of the oscillator output remain equal so that the only modulation of the oscillator is its frequency.

As mentioned above, when the output level at terminal 6 of the amplifier 15 is posiitve, feedback to charge the capacitor 20 takes place through the diode 22, and when the output at terminal 6 of the amplifier 15 is negative, the charging of the capacitor 20 takes place through diode 24, these diodes being alternately rendered conductive and non-conductive and the voltages to charge capacitor 20 being alternately taken through the resistors 21 and 23 of the second feedback path from the output terminal 6. When the switch 38 is in the F.M. position shown in solid lines in the drawing, the point Y is connected to the point B through the coupling resistor 35 and the point X is connected to the point A through the coupling resistor 34, and therefore any voltages which appear at the points A and B will become combined with voltages taken from the feedback resistors 21 and 23 to thereby change the rate at which the capacitor 20 is charged, which in turn changes the period of oscillation of the amplifier 15.

Assume, for instance, that the instantaneous polarity of the input signal is such as to drive the point A positive and the point B negative with respect to ground, and further assume that the oscillator 15 has flopped over to positive saturation at terminal D. Thus positive feedback voltage is taken from terminal D and applied through resistor 21 and diode 22 to charge the capacitor 20 and commence raising the potential at terminal 2 of differential amplifier 15 toward the positive potential at terminal 3, existing by virtue of feedback resistor 16. However, it was also assumed that terminal A was positive, and therefore an additional positive charging increment is coupled through the resistor 34 and applied to the point X. Therefore, because of the positive input signal at terminal A, the capacitor 20 is being charged more rapidly and the positive half cycle of oscillation of amplifier 15 will be shortened. Moreover, at this moment the diode 24 will be blocked by the positive potential applied at point Y through resistor 23, the negative potential coupled from point B being too small to overcome positive bias at point Y. Therefore, during the present half cycle of oscillation, the negative signal at point B has no effect. Ultimately, when the positive potential across the capacitor 20 arrives at such a level that terminal 2 crosses the positive level of terminal 3, the amplifier 15 will flop over toward negative saturation so that a large negative potential will appear at point D, thereby blocking the diode 22 and enabling the diode 24.

With the oscillator amplifier 15 now having its output standing at negative saturation, the capacitor 20 will begin charging in the negative direction by drawing current through the resistor 23 and the diode 24, the diode 22 being blocked. The negative potential supplied at point Y through the resistor 23 is now further augmented by negative potential coupled to point Y through resistor 35 and switch 38, the momentary signal at point B being negative since the momentary signal at point A is assumed to still be positive. Thus, the capacitor 20 will be charged in the negative direction at a rate faster than the rate which would normally occur if all of its charging current were drawn through resistor 23, and therefore the time required to charge the capacitor 20 negatively will also be reduced, again raising the frequency of the oscillator 15. Thus, it has been established that a positive input potential at point A raises the frequency of oscillation of the amplifier chip 15 during both of its half cycles, the larger the positive potential at point A, the greater the modulation of the oscillator in a direction to raise its frequency.

Conversely, it can be shown that the introduction of a negative signal increment at point A modulates the oscillator 15 in a direction to lower its frequency during both half cycles of oscillation. Assuming a negative signal increment at point A, and therefore a positive signal increment at point B, when the oscillator 15 has its output at positive saturation, a positive level will be fed back through resistor 23 to block diode 24 and a positive level will be fed back through resistor 21 and diode 22 to charge the capacitor 20 in the positive direction. However, this positive feedback at point X will be partially bucked out by a negative component coupled from point A through the resistor 34 and therefore it will take longer to charge the capacitor 20 to a positive level sufficient to exceed the positive level mentioned at terminal 3 by the partially bucked-out feedback through resistor 16, thereby lengthening the positive half cycle of oscillation. When the oscillator module 15 finally flops over to negative saturation at terminal D, thereby blocking the diode 22 and supplying negative charging current through diode 24 to charge capacitor 20 negatively, a positive increment will be applied to point Y through resistor 35 to partially buck out the negative feedback component supplied to point Y through resistor 23, and therefore it will take longer to charge capacitor 20 negatively, thereby also lengthening the negative half cycle of oscillation of the circuit 15. Thus, a negative signal at point A lengthens the period of oscillation during both half cycles and therefore reduces the frequency of the oscillator 15.

Therefore, the introduction of an analog signal to the input terminals 10, when the switch 38 is in the position shown in solid lines, modulates the frequency of the oscillator 15 without however changing the ratio of the lengths of its alternate half cycles.

AMPLITUDE MODULATION RECORDING MODE

The change-over to the A.M. method of operation is accomplished by moving the switch 39 to position 39' and the switch 38 to position 38' shown in dotted lines in the drawing, thus transferring the coupling of point Y from point B to point A through the resistor 35. This has the effect of lengthening one half cycle of oscillation and shortening the opposite half cycle of operation by about the same amount so that the over-all frequency of oscillation is not changed, but the ratio of the duration of adjacent half cycles is modulated by the input signal when it varies above or below ground potential. As mentioned above, the substitution of the capacitor 20' for the capacitor 20 merely provides a different basic oscillation rate, if desired.

Assuming a positive increment of input signal at point A, and assuming that the oscillator chip 15 has just reached positive saturation, the strong positive potential at point D will block the diode 24, but will pass positive current through the resistor 21 and the diode 22 to begin charging the capacitor 20' in the positive direction. The positive feedback at point X is added to by the positive signal increment at point A coupled through the resistor 34, and therefore the rate of charging of the capacitor 20' in the positive direction is increased by a positive signal at point A. Therefore, the positive half cycle of oscillation is shortened by a positive signal appearing at A. The positive increment applied at point Y through resistor 35 is insufficient to overcome the negative signal applied through resistor 23 to point Y and therefore the diode 24 remains blocked.

However, when the amplifier chip 15 flops over to negative saturation to provide a strong negative potential at point D, the diode 22 is blocked thereby, and the capacitor 20' begins charging in the negative direction through the resistor 23. However, the negative potential at Y contributed by resistor 23 is partially bucked out by a positive component applied through resistor 35 and therefore the negative half cycle of oscillation is lengthened, thus a positive potential at A shortens the positive half cycle, but lengthens the negative half cycle.

Conversely, a negative signal component applied at A has the opposite effect. Assuming that the oscillator module 15 has just arrived at positive saturation, the positive potential at point D blocks the diode 24 and renders the diode 22 conductive, but the positive feedback contributed to point X by resistor 21 is partially bucked out by the increment contributed from point A to point X through resistor 34. Therefore, the capacitor 20' takes longer to charge because of the presence of the negative signal at point A, and the positive half cycle of oscillation is accordingly lengthened. When the oscillator 15 flops over to negative saturation, the negative potential at point D will block the diode 22, but will start charging the capacitor 20' negatively through the diode 24. The feedback of negative current supplied through the resistor 23 is now augmented by a negative increment of signal applied through resistor 35 from the signal at point A, and therefore the capacitor 20' will be charged at a higher rate and the negative half cycle of oscillation will be shortened. Thus, a negative signal at point A lengthens the positive half cycle of oscillation, but shortens the negative half cycle of oscillation.

The method by which recording is accomplished by merely changing the ratio of the duration of the positive half cycle to the duration of the negative half cycle of the oscillation applied to the head winding W can be understood more easily by first reviewing the normal AC-biased recording technique. In ordinary recording using a magnetic head, the AC bias signal is of large amplitude, and usually has a frequency which is at least five times that of the highest frequency signal input sought to be recorded. The AC bias is present whether an intelligence signal is being introduced or not, and any signal potential applied to the head instantaneously adds to the bias or subtracts from it in such a manner as to effectively move the zero axis of the bias waveform up or down. Thus, when the signal is positive, the bias peaks are moved higher in the direction of positive saturation of the magnetic particles of the tape and the negative peaks become much smaller in effect so that the negative peaks draw away from saturating the magnetic particles of the tape in the negative direction. This gives a net result of recording a positive signal on the tape. Conversely, when the signal is negative, the zero axis of the AC bias is effectively moved downwardly thereby causing the negative peaks of the AC bias waveform to come closer to saturating the magnetic tape in the negative direction, whereas positive peaks of the AC bias waveform move further away from saturation of the tape in the positive direction, thereby giving a net magnetization of the recording medium in the negative direction.

The present system in the A.M. mode works somewhat differently, but provides a similar over-all effect. The oscillation rate of the oscillator 15 is assumed to be at least five times the highest frequency being inserted at the terminals 10. The frequency of the oscillation is adjusted, in combination with the record head inductance and resistor 27, so as to produce a partial integration of the square wave signal being applied to the recording head. Thus, during an unmodulated period when the two half cycles are equal, the current in the winding never has time to reach the full value to which it would go if the half cycles were permitted to remain constant without reversal until the current had reached a steady-state value, and in practice the peak current is usually less than one third of the steady-state value. To accomplish this, the resistor 25 is adjusted to provide enough square wave potential from the oscillator chip 15 to the terminals 13 to drive the magnetization of the particles of the tape 12 part way toward saturation in both directions in the absence of any input signal, meaning that both half cycles of the oscillation are about of equal duration.

However, when a modulated input signal is present at point A, one half cycle becomes longer and the other half cycle becomes shorter, and therefore the peak current during the longer half cycle rises to a higher level because it has more time to overcome the head inductance, whereas the peak current reached during the shorter half cycle is reduced and therefore retreats toward the zero axis. Thus, a net recording effect is obtained which is indistinguishable from the effect obtained by ordinary AC biased recording techniques. In both cases, the peak currents are changed, in the ordinary AC biased case by superimposing a signal current upon the AC bias, and in the present case by integrating the current in the inductance of the head winding W and then changing the half-cycle durations with respect to each other to unbalance the momentary peak currents attributable to successive half cycles, thereby to produce a net change in the flux in the recorded medium M.

A suitable set of circuit values to make a practical embodiment using the circuit as illustrated in the drawing is as follows:

Integrated Differential Amplifier 15—Fairchild 709C
Resistors 16, 21, 23, 24 and 35—100K ohms
Potentiometer 19—1000 ohms
Capacitor 20—0.15 mfd.
Capacitor 20'—0.010 mfd.
Diodes 22 and 24—1N625
Potentiometer 25—10K ohms
Resistor 26—100 ohms
Resistors 14 and 27—1000 ohms The present invention is not to be limited to the exact form shown in the drawing for changes can be made therein within the scope of the following claims:

I claim:

1. An oscillatory circuit for driving the winding of a magnetic head for recording an analog intelligence signal on a magnetic medium, comprising:

(a) a differential amplifier having an output connected to said head winding, and having first and second differential inputs, all referenced to a common terminal;

(b) first feedback means connected from the output to the first input and phased to drive the amplifier toward saturation;

(c) second feedback means comprising impedance means connected at one end to the output, and connected at the other end to the second input;

(d) feedback integrating means connected from the second input to the common terminal; and (e) modulation means coupling said analog intelligence signal to said integrating means for affecting the rate of feedback and integration thereof at said second input in response to variations in intelligence-signal polarity and amplitude.

2. In an oscillatory circuit as set forth in claim 1, network means connecting said output to said winding; phase inverting means for receiving said intelligence signal and delivering a similar invert signal; said second feedback means including two feedback impedances each connected at one end to said output, and further including two oppositely facing diodes both connected at one end to said second input, and the impedances and diodes being mutually connected at separate junctions at their respective other ends; and means respectively connecting said input signal and said invert signal to separate ones of said junctions to respectively contribute separate increments to the integrating means to alter its rate, as otherwise determined by said feedback impedances.

3. In an oscillatory circuit as set forth in claim 1, said second feedback means including two feedback impedances each connected at one end to said output, and further including two oppositely facing diodes both connected at one end to said second input, and the impedances and diodes being mutually connected at separate junctions at their respective other ends; and means respectively connecting said input signal to separate ones of said junctions to contribute to said integrating means increments of charge which are dependent upon the instantaneous polarity and amplitude of said intelligence signal, thereby to shorten the half cycle of oscillation which corresponds in polarity with the instantaneous polarity of said signal, and lengthen the opposite half cycle; and network means connecting said output to said winding and including impedance means adjustable to cooperate with the frequency of oscillation and the impedance of the head winding to limit the rise of head current during equal half cycles in the latter mode to fall short of the peak currents which would flow in the winding if the normal half cycles were lengthened, whereby the peak current flowing on any half cycle is modulated by its duration.

4. In an oscillatory circuit as set forth in claim 1, said modulation means comprising means for coupling said analog signal to said integrating means to contribute increments of charge thereto which are dependent upon the instantaneous polarity and amplitude of said signal, thereby to shorten a half cycle of oscillation during which the polarity of said increment is additive to the feedback polarity from said second means and to lengthen a half cycle during which the polarity of said increment subtracts from the feedback.

5. In an oscillatory circuit as set forth in claim 4, means for pulse-width modulating the oscillations in response to said analog intelligence signal; said second feedback means including two feedback impedances each connected at one end to said output, and further including two oppositely facing diodes both connected at one end to said second input and respectively connected to the feedback impedances at separate junctions at their other ends; and each junction being connected by separate connecting means to a common singal to contribute separate increments to the integrating means to alter its rate, as otherwise deterimned by said feedback impedances.

6. In an oscillatory circuit as set forth in claim 5, said connecting means comprising resistances and said feedback impedances comprising resistances, and these resistances forming voltage divider circuits coupled to said other ends of said diodes and connected such that an alternate one of said diodes is back-biased when the other is forward-biased.

7. In an oscillatory circuit as set forth in claim 4, means for frequency modulating the oscillation cycles in phase inverting means for receiving said input signal and response to said analog intelligence signal, comprising delivering a similar invert signal; said second feedback means including two feedback impedances each connected at one end to said output and said coupling means comprising two oppositely facing diodes both connected at one end to said second input and respectively connected to the impedances at separate junctions at their other ends; and means respectively connecting said input signal and said invert signal to said separate junctions to alter the rate of charge of the integrating means as otherwise determined by said feedback impedances.

8. In an oscillatory circuit as set forth in claim 7, said connecting means comprising resistances and said feedback impedances comprising resistances, and these resistances forming voltage divider circuits coupled to said other ends of said diodes and connected such that an alternate one of said diodes is back-biased when the other is forward-biased.

9. In an oscillatory circuit as set forth in claim 7, switch means for selectively connecting the respective coupling means either to oppositely phased signals from said phase inverting means, or to the same signal thereof, whereby in the former case the oscillations are frequency modulated by intelligence signals, and in the latter case the oscillations have the relative durations of their alternate half cycles modulated by said intelligence signals.

References Cited

UNITED STATES PATENTS

| | | | |
|---|---|---|---|
| 3,423,540 | 1/1969 | Wortzman | 179—100.2 |
| 2,442,317 | 5/1948 | Usselman | 331—135 |

BERNARD KONICK, Primary Examiner

J. ROSENBLATT, Assistant Examiner

U.S. Cl. X.R.

331—135